Patented Aug. 26, 1952

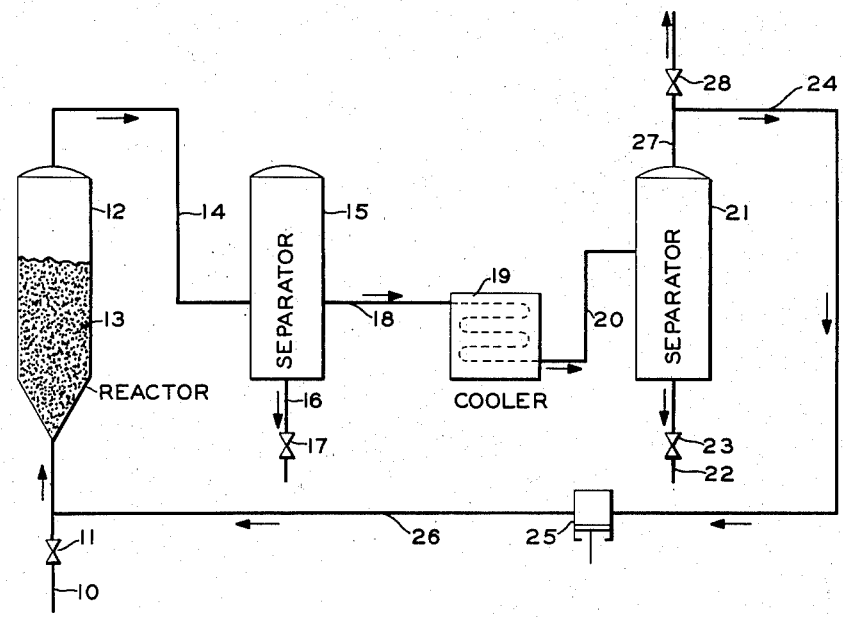

2,608,568

UNITED STATES PATENT OFFICE 2,608,568

REGENERATION OF CATALYST

John Paul Hogan, Bartlesville, Okla., and Alvin H. Friedman, Kansas City, Mo., assignors to Phillips Petroleum Company, a corporation of Delaware Application April 12, 1948, Serial No. 20,383

5 Claims. (Cl. 260—449.6)

The present invention relates generally to the synthesis of hydrocarbons and more specifically to an improved method for regenerating or reactivating catalysts whose catalytic activity has been decreased by use during such synthesis.

In the conversion of hydrogen and carbon monoxide in the presence of a catalyst into hydrocarbons by what is commonly known as the Fischer-Tropsch process, it has been found that in time the efficiency of the catalyst is greatly reduced. Generally, this reduction in efficiency is caused by deposition upon the catalyst particles of high molecular weight hydrocarbons, such as waxes and/or other compounds that lower catalyst activity. Various methods have been suggested for overcoming this difficulty. One such method is simply to raise the temperature in the reaction chamber in order to volatilize the waxy deposits, but this remedy is usually undesirable since more elevated temperatures tend toward a high production of methane and carbon whereas the desired products are hydrocarbons boiling within the gasoline range. Another method is to treat the catalyst with a solvent which will remove the deleterious deposits from the catalyst and still another method is to treat the catalyst with hydrogen or gases containing hydrogen, or vapors such as steam which split off hydrogen, in order to remove the deposits.

An object of this invention is to provide an improved method for reactivating a catalyst whose activity has been reduced. Another object of this invention is to provide an economical method for dewaxing and reactivating a catalyst that has been used in a hydrocarbon synthesis reaction by recycling the tail gas from the synthesis reaction. Additional and inherent objects will be shown by the description below.

We have found that hydrocarbon synthesis catalysts whose catalytic activity has been reduced by use in a synthesis reaction can be regenerated or reactivated by the simple, efficient and economical method of using the tail gas from the reaction chamber as the means for regeneration.

In operating a Fischer-Tropsch synthesis in which carbon monoxide and hydrogen are reacted in the presence of a catalyst, for example, an iron catalyst prepared by burning iron to magnetic iron oxide ($Fe_3O_4$), promoting with alkali metals and/or alumina, and reducing with hydrogen, though numerous other suitable catalysts are known, the catalyst declines in activity but may be regenerated, usually by passage over this catalyst of hydrogen or suitable hydrogen-containing gas. In this regeneration, contaminating wax and/or other compounds lowering the catalyst activity are removed in at least sufficient quantities to bring the catalyst back to suitable activity for further operation in the synthesis cycle.

In operating with fluidized catalyst in this synthesis, it has been found desirable to maintain higher gas velocities through the bed than feasibly attainable when only synthesis gas is charged to the reaction zone. To attain the objective of these higher velocities, the synthesis gas plus tail gas is charged to the reactor, usually in a proportion of about four volumes of tail gas to one volume of synthesis gas. The tail gas is the $C_4$ and lighter components of the reactor effluent, plus such small amounts of $C_5$ and higher boiling compounds not readily removed from this fraction.

In accordance with this invention, the catalyst is regenerated at such times when its activity falls below the desired level by discontinuance of the charging of synthesis gas and recycling the entire tail gas stream to the chamber containing the catalyst. As this operation is begun, the tail gas contains some carbon monoxide and a substantial amount of hydrogen, plus some other relatively inert gases. At the start of this operation, the regeneration is begun at operating pressure, but this pressure rapidly drops to about half the reaction pressure due to the conversion of a portion of the components of the tail gas, the carbon monoxide content of this gas dropping to negligible concentration by conversion in the reaction zone. Thus, the gas used in the regeneration is substantially hydrogen and inerts, and it is obtained from the synthesis gas. The drop in pressure accompanying this method of regeneration is advantageous in that it speeds the dewaxing process. The regeneration time is usually from about one hour to about three hours.

After the regeneration cycle is completed, the reaction cycle is started by cutting in fresh feed at the desired rate, and withdrawing tail gas from the system when reaction pressure is reached at such a rate that the pressure level is maintained.

Specific advantages to be gained by practicing this invention are: (1) no gas other than synthesis gas is required for regeneration, and (2) the pressure in the system is automatically reduced to a desirable level without loss of time or synthesis gas.

Figure 1 is a schematic diagram of one specific embodiment of this invention. In the synthesis cycle, synthesis gas containing at least a major proportion of hydrogen and carbon monoxide in the molal ratio of 2 to 1 enters the system from a source not shown through conduit 10, containing valve 11, and is joined by the tail gas stream conducted through conduit 26 from a source to be described. The entire stream is conducted to reaction chamber 12, containing catalyst bed 13. The reaction chamber is operated as a fluidized fixed bed system, and one preferred catalyst is reduced iron oxide, prepared as previously described, and promoted with about 0.5 weight per cent potassium oxide and about 1.5 weight per cent aluminum oxide. The catalyst is suitably finely divided, say a range between about 65 mesh to about 140 mesh, so the bed may readily be maintained in fluidized form. Temperature within the bed is maintained at about 600° F. by heat exchange surfaces, not shown, and the pressure maintained at about 200 p. s. i. by controls not shown.

The effluent from chamber 12 is conducted through conduit 14 to wax separator 15, and the separated wax removed through conduit 16, containing valve 17. The dewaxed effluent is then conducted via line 18 through cooler 19, and thence via conduit 20 to liquid product separator 21. The separated liquid product is removed from separator 21 through conduit 22, controlled by valve 23. The tail gas is removed from separator 21 through conduit 27 and a portion vented, the amount vented being controlled by valve 28. The remainder of the tail gas is conducted through conduit 24 to compressor 25, thence via conduit 26 to conduit 10 and subsequently following a previously described route.

When catalyst activity has fallen to such a level that regeneration is desirable, valves 11 and 28 are shut off, thus discontinuing charging of feed gas and venting of tail gas and accomplishing complete recycle of this tail gas. The synthesis step is thus discontinued and regeneration begins. The pressure within the system rapidly drops to about half that of the synthesis cycle. The carbon monoxide is quickly converted and the carbon monoxide content of the gas passing through the catalyst chamber is reduced to substantially zero. Complete recycle of the tail gas is continued until the catalyst activity is brought up to the desired level, which usually requires from about one to about three hours. The temperature during regeneration is held at about reaction temperature.

At the conclusion of the regeneration cycle, valve 11 is opened to allow the charge gas to enter at the desired rate; and, when the pressure within the system rises to the desired operating pressure, valve 28 is opened to vent sufficient tail gas to maintain the desired operating pressure.

Another embodiment of this invention permits the regeneration process to be accomplished without any change in pressure within the reaction chamber. As described above valve 28 is closed and the complete supply of tail gas is returned to the reaction chamber, but, in this alternative embodiment, valve 11 is maintained partially open to permit the entrance of sufficient feed gas into the reaction chamber to maintain the pressure within the chamber at substantially the operating pressure of the synthesis reaction. Thus, the operating conditions are maintained within the reaction chamber throughout the regeneration process, and, after the regeneration is complete, the synthesis of hydrocarbons can be resumed immediately at operating conditions.

In this alternative method of operation all the tail gas is recycled to the reaction chamber and only sufficient feed gas is added to maintain the pressure in the reaction chamber at the operating level used for the synthesis reaction. In this manner of operation, the ratio of recycled tail gas to fresh feed gas is considerably greater than the ratio of recycled gas to feed gas in a hydrocarbon synthesis process wherein synthesis gases are diluted with recycled gases.

This invention is applicable to all catalysts that are used to effect the hydrocarbon synthesis commonly known as the Fischer-Tropsch synthesis. Thus, it is apparent that the preferred ranges of conditions for carrying out this invention are dependent upon the specific catalyst used in the synthesis reaction. Generally, the preferred temperature range for this invention varies from 10° to 15° F. above the synthesis temperature down to and including the synthesis temperature, but temperatures outside this range may be used effectively. Also, the pressure at which the reaction is effected is dependent upon the specific catalyst used. For the preferred embodiment of this invention the pressure is approximately one-half that at which the synthesis reaction is carried out. In the alternative embodiment the pressure is approximately the same as the synthesis pressure. For example, in using a promoted reduced iron oxide catalyst the synthesis reaction is effected at about 200 p. s. i. The preferred embodiment of this invention would be carried out at about 100 p. s. i., but the alternative embodiment would be carried out at about 200 p. s. i. The space velocities are also dependent upon the specific catalyst used in the synthesis. If a fluid type catalyst is used, the space velocity may vary between the minimum required for fluidization of the catalyst and the transport velocity. These velocities can well be expressed in terms of the apparent linear velocities which are from about 0.6 to about 2.0 feet per second respectively. When a fixed bed operation is employed, it is well known that the space velocities are considerably lower than those used with a fluid bed operation, and, therefore, the space velocities employed in this invention would further depend upon whether a fluid or fixed bed operation were used in the synthesis reaction.

*Example*

After operating a hydrocarbon synthesis with the fluid bed type operation at about 600° F. and about 200 p. s. i. and with a space velocity of 2000–3000 volumes of feed gas per volume of catalyst per hour, it was found after a period of operation with a reduced iron oxide catalyst promoted with 0.5% potassia and 1.5% alumina and having a mesh size of 65–140 that the efficiency of conversion of carbon monoxide to $C_5^+$ hydrocarbons had fallen below the minimum desired value of about 40% at about 90% conversion of carbon monoxide. The regenerating operation was begun by recycling all the tail gas as described above in the preferred method. The temperature of the catalyst was held substantially constant at about 600° F. and the pressure dropped to approximately 100 p. s. i. This process was continued for 3 hours, and, when the hydrocarbon synthesis was resumed, it was found that the efficiency of the conversion of carbon monoxide to $C_5^+$ hydrocarbons had increased to 60% at a conversion of carbon monoxide of 95%.

Obviously, our invention is subject to variation, and it should not be limited by the above

We claim:

1. In the hydrogenation of a carbon oxide in the presence of a suitable catalyst wherein the catalytic activity of said catalyst is decreased by deposition of reaction products thereon, the method of improving the catalytic activity of a catalyst whose activity has been so decreased which comprises interrupting the flow of reactants to the reaction zone, separating the normally gaseous phase from the reaction zone effluent, returning thus-separated gaseous phase to said reaction zone to hydrogenate the carbon monoxide in said gaseous phase, separating the hydrogen-rich carbon monoxide-free gaseous phase from the effluent of the last-named hydrogenation step, and contacting catalyst in said reaction zone in the absence of carbon monoxide with said carbon monoxide-free gaseous phase for a period of time sufficient to remove at least a portion of the depositions from said catalyst.

2. In the synthesis of hydrocarbons by the reaction of hydrogen and carbon monoxide in the presence of a reduced iron oxide catalyst wherein the catalytic activity of said catalyst is decreased by deposition of high molecular weight waxy reaction products thereon, the method of improving the catalytic activity of an iron catalyst whose activity has been so decreased which comprises interrupting the flow of synthesis reactants to the synthesis reaction zone, separating $C_5$ and higher boiling reaction products from the effluent from said reaction zone, continuously recycling to said reaction zone the balance of said effluent to hydrogenate the carbon monoxide therein and thus to remove the carbon monoxide therefrom, separating the hydrogen-rich, carbon monoxide-free gaseous phase from the effluent of the last-named hydrogenation step, and continuously recycling the thus-separated carbon monoxide-free gaseous phase through said reaction zone for a period of one to three hours to remove at least a portion of the depositions from the catalyst in said reaction zone.

3. A method according to claim 1 wherein the catalyst is a reduced iron oxide catalyst.

4. A method according to claim 2 wherein a fluidized bed of catalyst is employed.

5. A method according to claim 2 wherein a fixed bed of catalyst is employed.

JOHN PAUL HOGAN.
ALVIN H. FRIEDMAN.

REFERENCES CITED

The following references are of record in the file of this patent:

UNITED STATES PATENTS

| Number | Name | Date |
|---|---|---|
| 2,231,990 | Dreyfus | Feb. 18, 1941 |
| 2,244,196 | Herbert | June 3, 1941 |
| 2,251,554 | Sabel | Aug. 5, 1941 |
| 2,276,274 | Keith, Jr. | Mar. 17, 1942 |
| 2,414,276 | Sensel et al. | Jan. 14, 1947 |
| 2,451,879 | Scharmann | Oct. 19, 1948 |